(12) United States Patent
Tucker et al.

(10) Patent No.: US 10,392,989 B1
(45) Date of Patent: Aug. 27, 2019

(54) AUTOMOTIVE EXHAUST AFTERTREATMENT SYSTEM HAVING AN AMMONIA DISTRIBUTOR

(71) Applicant: Faurecia Emissions Control Technologies, USA, LLC, Columbus, IN (US)

(72) Inventors: Alfred Tucker, Columbus, IN (US); Philip Dimpelfeld, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 16/165,341

(22) Filed: Oct. 19, 2018

(51) Int. Cl.
*F01N 3/20* (2006.01)
*B01D 53/94* (2006.01)
*B01D 53/96* (2006.01)
*B60K 13/04* (2006.01)

(52) U.S. Cl.
CPC ....... *F01N 3/2073* (2013.01); *B01D 53/9418* (2013.01); *B01D 53/9431* (2013.01); *B01D 53/96* (2013.01); *B60K 13/04* (2013.01); *B01D 2251/2062* (2013.01); *B01D 2257/40* (2013.01); *F01N 2240/25* (2013.01); *F01N 2610/02* (2013.01); *F01N 2610/06* (2013.01); *F01N 2610/14* (2013.01)

(58) Field of Classification Search
CPC ............................. F01N 3/2066; F01N 3/2073
See application file for complete search history.

(56) References Cited

U.S. PATENT DOCUMENTS

| | | |
|---|---|---|
| 7,448,207 B2 | 11/2008 | Jozsa |
| 7,964,163 B2 | 6/2011 | Johannessen |
| 8,551,219 B2 | 10/2013 | Johannessen |
| 9,010,091 B2 | 4/2015 | Johannessen |
| 10,036,291 B2 | 7/2018 | Kotrba |
| 2011/0219745 A1 | 9/2011 | Griffin |
| 2015/0121855 A1 | 5/2015 | Munnannur |
| 2017/0087515 A1* | 3/2017 | Huang ............... B01D 53/9477 |

FOREIGN PATENT DOCUMENTS

DE  102011078181 A1  1/2013

* cited by examiner

*Primary Examiner* — James A Shriver, II
*Assistant Examiner* — James J Triggs
(74) *Attorney, Agent, or Firm* — Barnes & Thornburg LLP

(57) ABSTRACT

An automotive exhaust aftertreatment system for a combustion engine in an automobile includes an ammonia gas distribution system for delivering gaseous ammonia to an exhaust stream. The ammonia gas distribution system is configured to mix the ammonia and the exhaust stream together before the exhaust gas and ammonia are exposed to a catalyst in the SCR.

14 Claims, 3 Drawing Sheets

AUTOMOTIVE EXHAUST AFTERTREATMENT SYSTEM HAVING AN AMMONIA DISTRIBUTOR

BACKGROUND

The present disclosure relates to exhaust aftertreatment systems for automotive applications, and particularly to an aftertreatment device for injecting and mixing gaseous ammonia into the exhaust stream.

SUMMARY

A vehicle in accordance with the present disclosure includes a combustion engine and an exhaust aftertreatment system. The engine is located in an engine compartment and produces an exhaust stream during operation and is coupled to the aftertreatment system via an exhaust passageway. The aftertreatment system is configured to inject gaseous ammonia from an onboard ammonia gas generator into the exhaust stream upstream of a selective catalytic reduction unit (SCR). The ammonia gas is used as a reducing agent that combines with the exhaust stream to cause a chemical reaction when exposed to the SCR and reduce effluents, such as nitrous oxides (NOx), in the exhaust stream before it is released into the atmosphere.

In illustrative embodiments, the aftertreatment system includes an ammonia gas distribution system for delivering the gaseous ammonia to the exhaust stream. The ammonia gas distribution system is further configured to mix the ammonia and the exhaust stream together before the exhaust gas and ammonia are exposed to a catalyst in the SCR.

In illustrative embodiments, a gas distributor included in the gas distribution system is a tubular component that is fluidly coupled to the ammonia gas generator. The gas distributor includes a straight portion and a complete-circle shaped portion. The straight portion and the complete-circle shaped portion are formed to include a plurality of discharge holes to release the gaseous ammonia into the distributor body. The straight portion bisects the complete-circle shaped portion and is attached at two locations to a mixer duct such that the gas distributor is simply supported relative to other components of the system.

In illustrative embodiments, the ammonia gas distribution assembly is located within the engine compartment of a vehicle. This arrangement is designed to minimize heat loss from the exhaust gas as it leaves the combustion chambers of the engine.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 4:
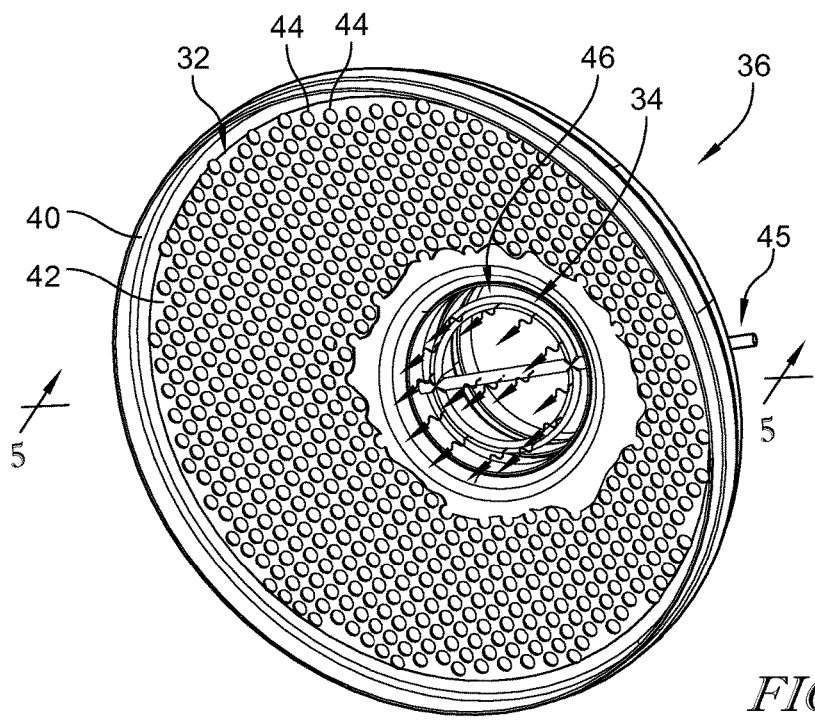
Figure 5:
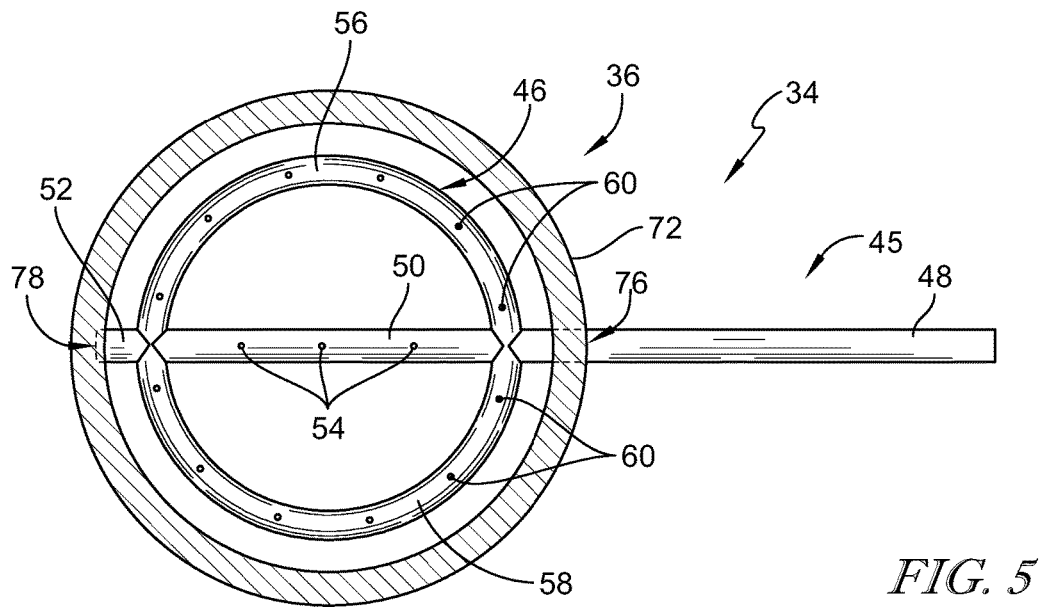

FIG. 4 is a perspective view of the ammonia gas distribution system with portions removed to show the gas distributor positioned in the inlet conduit and injecting ammonia gas toward the perforated plate; and FIG. 5 is sectional view of the inlet conduit taken along line 5-5 in FIG. 4 showing the gas distributor arranged in the inlet and showing that the gas distributor includes a straight portion and a complete-circle portion and a plurality of injection holes are formed in the straight portion and the complete-circle portion for releasing the ammonia gas into the ammonia gas distribution system.

DETAILED DESCRIPTION

For the purposes of promoting an understanding of the principles of the disclosure, reference will now be made to a number of illustrative embodiments illustrated in the drawings and specific language will be used to describe the same.

Figure 1:
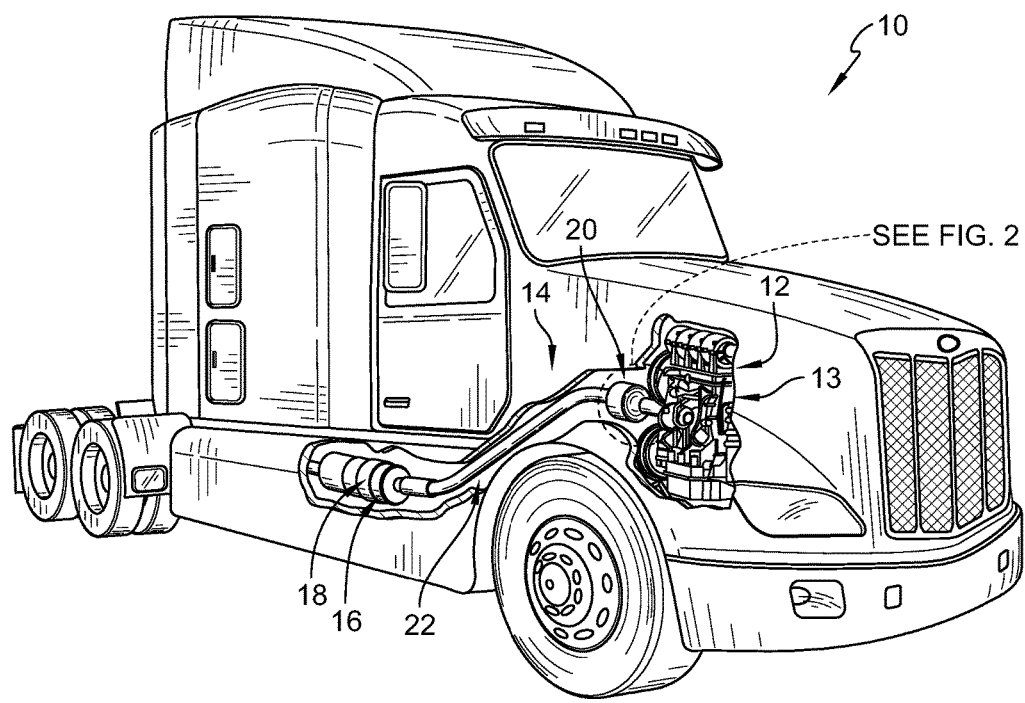
FIG. 1 is perspective view of an automotive vehicle including a combustion engine contained within an engine compartment and an automotive exhaust aftertreatment system including a selective catalytic reduction unit (SCR) and an ammonia gas distribution system coupled to the engine within the engine compartment.

An illustrative diesel engine vehicle 10 is shown in FIG. 1 includes a combustion engine 12 and an automotive exhaust aftertreatment system 14. The engine 12 is contained within an engine compartment 13 of the vehicle 10. The exhaust aftertreatment system 14 may include a plurality of exhaust aftertreatment devices such as, for example, a diesel oxidation catalyst (DOC) 16, a diesel particulate filter (DPF) 18, and an ammonia gas distribution system 20. Several of the aftertreatment devices may be located in the engine compartment 13 while others may be located downstream of the engine compartment 13. An exhaust passageway 22 is configured to direct an exhaust stream from the engine 12 to the exhaust aftertreatment system 14. Each of the DOC 16, the DPF 18, and the ammonia gas distribution system 20 is configured to treat the exhaust stream and remove harmful effluents from the exhaust stream before it is released into the atmosphere.

Figure 2:
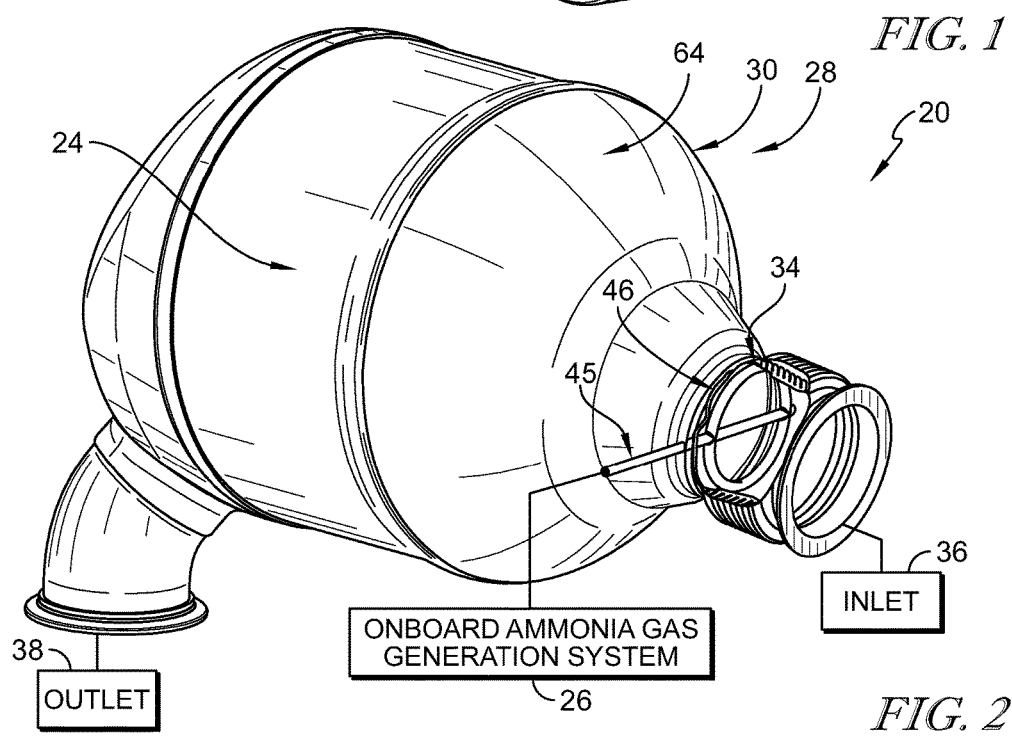
FIG. 2 is an enlarged perspective view of the SCR and the ammonia gas distribution system with a portion cut away to show that the ammonia gas distribution system includes a gas distributor configured to inject a stream of ammonia gas into the automotive exhaust aftertreatment system upstream of the SCR.

In the illustrative embodiment, the ammonia gas distribution system 20 includes a selective catalytic reduction unit (SCR) 24, an onboard ammonia gas generation system 26, and an ammonia gas distribution assembly 28 as shown in FIG. 2. The SCR 24 includes a catalyst that is configured to reduce nitrogen oxides in the exhaust stream. The onboard ammonia gas generation system 26 is configured to generate gaseous ammonia to be supplied to the ammonia gas distribution assembly 28. The ammonia gas distribution assembly 28 is configured to inject the gaseous ammonia into the exhaust passageway 22 upstream of the SCR 24 and mix the ammonia with the exhaust stream. The ammonia chemically reacts with the exhaust stream and the catalyst in the SCR 24 to reduce nitrogen oxides from the exhaust stream before the exhaust stream is released into the atmosphere.

In other embodiments, a second SCR and/or a Diesel Exhaust Fluid (DEF) delivery system may be further included in the aftertreament system 14 and located downstream of the ammonia gas distribution assembly 28. In yet another embodiment, the ammonia gas distribution system 20 may further include an Ammonia Oxidation Catalyst (Ammonia Slip Catalyst) located downstream of the SCR catalyst. The ammonia oxidation catalyst may be zone-coated onto the same catalyst substrate as the SCR, or a separate catalyst.

In the illustrative embodiment, the onboard ammonia gas generation system 26 is known as an Ammonia Storage and Delivery System (ASDS) developed by Amminex Emissions Technology. Some examples of an ASDS are shown and described in U.S. Pat. Nos. 9,010,091, 8,551,219, and 7,964,163, each of which is incorporated by reference herein in their entirety. However, in other embodiments, any suitable ammonia generation system or other gaseous catalytic reduction agent source may be used.

Figure 3:
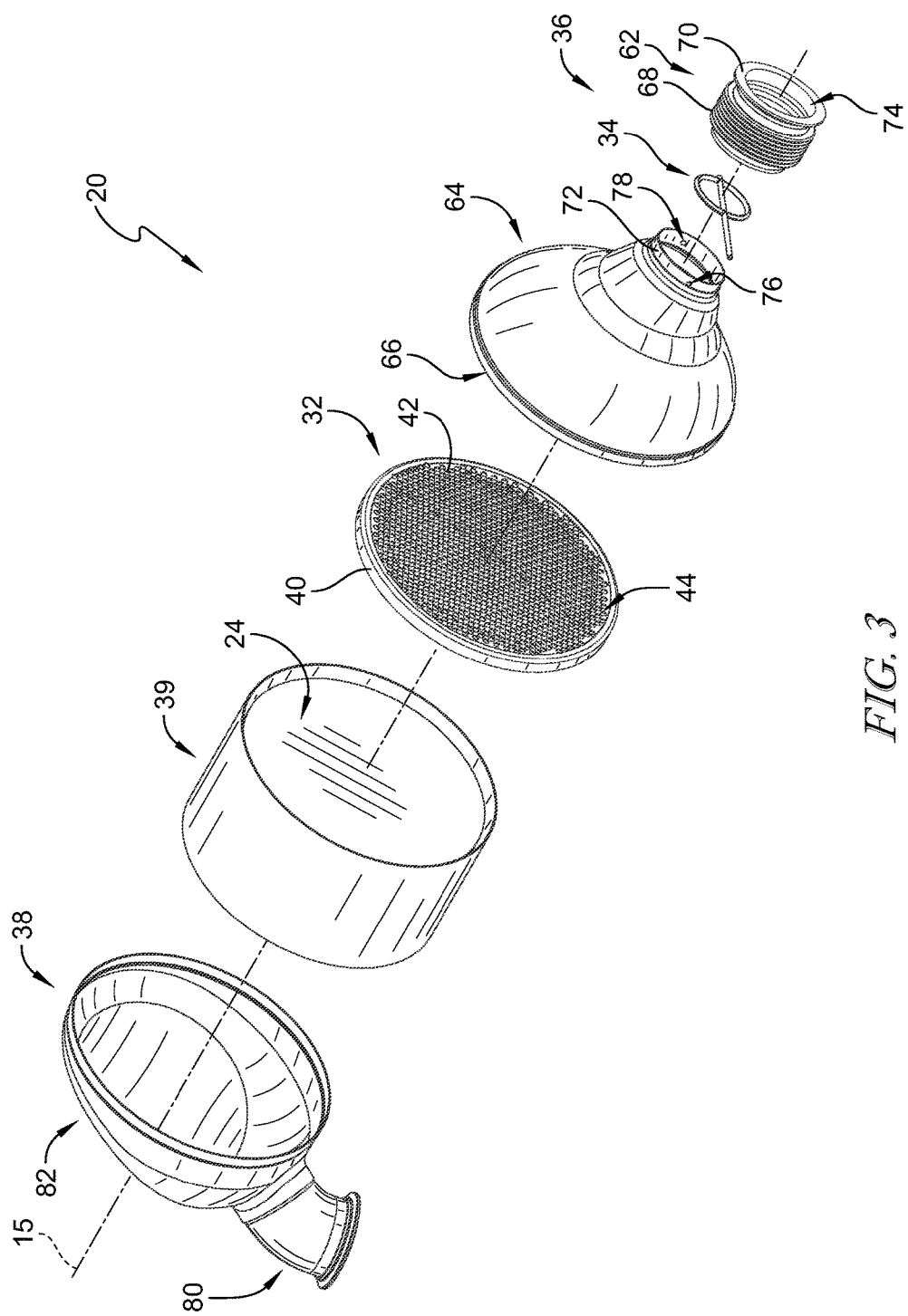
FIG. 3 is an exploded perspective view of the ammonia gas distribution system including, from right to left, an inlet conduit, the gas distributor, an inlet cone, a perforated plate, the SCR, and an outlet.

The ammonia gas distribution assembly 28 is coupled to the engine 12 and is positioned within the engine compartment 13 as shown in FIG. 1. The location of the ammonia gas distribution assembly 28 and the SCR 24 increases the efficiency of the exhaust aftertreatment system 14 by decreasing warm-up time of the ammonia gas distribution system 20 during cold-start operation. The ammonia gas distribution assembly 28 includes a distributor body 30, a perforated plate 32, and a gas distributor 34 as shown in FIGS. 2 and 3. In the illustrative embodiment, the distributor body 30 is coupled directly to an exhaust outlet of a turbocharger included in the engine 12 and houses the SCR 24. The perforated plate 32 is positioned upstream of the SCR 24 between the SCR 24 and the gas distributor 34. The gas distributor 34 extends into the distributor body 30 and is configured to inject the gaseous ammonia into the exhaust stream that is produced by the onboard ammonia gas generation system 26.

The distributor body 30 includes an inlet 36, an outlet 38, and an SCR housing 39 as shown in FIG. 3. The inlet 36 is adapted to couple to the exhaust outlet of the turbocharger included in the engine 12. The outlet 38 is shaped to conduct treated exhaust stream from the ammonia gas distribution assembly 28 toward other devices included in the aftertreatment system 14 such as, for example, the DOC 16 and/or the DPF 18. The SCR 24 is positioned between the perforated plate 32 and the outlet 38 and is contained within an interior space defined by the SCR housing 39.

The perforated plate 32 is configured to distribute the gaseous ammonia and the exhaust stream evenly across the SCR 24. The perforated plate 32 includes a rim 40 and a panel 42 as shown in FIGS. 3 and 4. The rim 40 extends downstream from the panel 42 and is configured to couple to the SCR 24 and/or the distributor body 30 to arrange the panel 42 between the inlet 36 of the distributor body 30 and the SCR 24. The panel 42 is formed to include a plurality of holes 44 spaced evenly across the panel 42. The plurality of holes 44 are configured to distribute the velocity and the concentration of the exhaust stream and the gaseous ammonia uniformly across the SCR 24.

The gas distributor 34 is received within the inlet 36 of the distributor body 30 and is configured to discharge the gaseous ammonia directly toward the perforated plate 32 as shown in FIG. 4. The gas distributor 34 includes a straight portion 45 and a complete-circle shaped portion 46. The straight portion 45 is tubular and is coupled to the complete-circle shaped portion 46 to permit the gaseous ammonia to flow from the straight portion 45 to the complete-circle shaped portion 46. The complete-circle shaped portion 46 is tubular and is configured to lie within the inlet 36 of the distributor body 30 to discharge the gaseous ammonia therein.

The straight portion 45 extends from outside of the assembly 28, into the inlet 36, and all the way across the inlet 36 as shown in FIGS. 2 and 4. The straight portion 45 includes an inlet member 48, a cross member 50, and a tail member 52 as shown in FIG. 5. The inlet member 48 is adapted to couple to the ammonia generation system 26 to conduct gaseous ammonia to the cross member 50 and the complete-circle shaped portion 46. The cross member 50 extends all the way across the complete-circle shaped portion 46 and is formed to include a plurality of discharge holes 54. The plurality of discharge holes 54 includes three discharge holes that are spaced apart evenly along the cross member 50. However, in other embodiments, the cross member 50 may not include any discharge holes. The tail member 52 is spaced apart from the cross member 50 by the complete-circle shaped portion 46 and is coupled to the exhaust passageway 22 to simply support the gas distributor 24 in the exhaust passageway 22.

The complete-circle shaped portion 46 extends circumferentially around the inlet 36 as shown in FIGS. 2 and 4. The complete-circle shaped portion 46 includes a first half circle 56 and a second half circle 58 as shown in FIG. 5. The first half circle 56 and the second half circle 58 cooperate to form the complete-circle shaped portion 46. The first half circle 56 and the second half circle 58 are formed to include a plurality of discharge holes 60. In the illustrative embodiment, the plurality of discharge holes 60 includes 12 discharge holes spaced apart evenly around the complete-circle shaped portion 46. In another embodiment, six discharge holes 60 are formed in the complete-circle shaped portion 46. However, in other embodiments, any suitable number discharge holes may be used. In the illustrative embodiment, the discharge holes 54, 60 have a diameter equal to about 0.5 millimeters. In other embodiments, the discharge holes may have any suitable diameter and may not be spaced apart evenly from one another.

Turning again to FIGS. 2 and 3, the inlet 36 includes an inlet conduit 62 and an inlet cone 64. The inlet conduit 62 is adapted to couple directly to an exhaust outlet of a turbocharger included in the engine 12 of the vehicle 10. The inlet cone 64 is frustoconical and defines a retention chamber 66 between the inlet cone 64 and the perforated plate 32. The gaseous ammonia is released into the retention chamber 66 where it is mixed with the exhaust stream. The perforated plate 32 regulates the mixture of the exhaust stream and the gaseous ammonia by distributing uniformly the mixture through the holes 44 in the perforated plate 32.

The inlet conduit 62 includes a neck 68, a rim 70 and a distributor-retainer ring 72 as shown in FIG. 3. The neck 68 extends between the rim 70 and the distributor-retainer ring 72. The rim 70 defines an opening 74 into the inlet conduit 62 that receives the exhaust stream. The distributor-retainer ring 72 is coupled to the neck 68 and the inlet cone 64 and is formed to include an aperture 76 that is sized and shaped to receive the inlet member 48 of the straight portion 45 of the gas distributor 34. A notch 78 may be formed in the distributor-retainer ring 72. The notch 78 is located opposite the aperture 76 and is sized and shaped to receive the tail member 52 of the straight portion 45 of the gas distributor 34 to simply support the gas distributor 34 in the inlet conduit 62.

The outlet 38 includes an outlet conduit 80 and an outlet cone 82 as shown in FIG. 3. The outlet conduit is configured to direct the exhaust stream away from the assembly 28 toward additional aftertreatment devices or the atmosphere. The outlet cone 82 is shaped to receive the exhaust stream from the SCR 24 and direct the exhaust stream toward the outlet conduit 80.

In the illustrative embodiment, the inlet conduit 62 and the outlet conduit 80 are offset from a central axis 15 of the assembly 28 as shown in FIGS. 2 and 3. In particular, the inlet conduit 62 is arranged radially outward from the central axis 15 but extends generally parallel with the central axis 15. The outlet conduit 80 is arranged radially outward from the central axis 15 but extends generally perpendicular to the central axis 15.

In illustrative embodiments, the ammonia gas distribution system may mix ammonia and engine exhaust in a short distance. The ammonia gas distribution system may be a compact system placed close to the exit of the engine (close coupled) to achieve fast warm-up during cold-start operation. An ammonia gas distributor or mixer may consist of a circular-formed tube with a straight cross-section (optional), followed by a perforated plate upstream of an SCR catalyst. The tube has a number of small holes for the introduction of ammonia into the exhaust. In this example, there are twelve holes in the circular-formed tube (with a diameter of about 0.5 mm to about 1.19 mm), and another three holes in a straight tube crossing the circular tube. The perforated plate can help to distribute the flow of mixed engine exhaust and ammonia gases more uniformly before it reaches the catalyst in the SCR. The uniformity is both in gas velocity and ammonia concentration.

The following numbered clauses include embodiments that are contemplated and non-limiting:

Clause 1. An exhaust aftertreatment system adapted for use in automotive applications, the system comprising
a selective catalytic reduction unit including a catalyst mounted in a housing,
an onboard ammonia gas generation unit, and
an ammonia gas distribution assembly, the ammonia gas distribution assembly including (i) an inlet that defines a passageway configured to carry exhaust gas from an automotive engine toward the selective catalytic reduction unit and (ii) a gas distributor fluidly coupled to the onboard ammonia gas generation unit and arranged to extend into the passageway of the inlet,
wherein the gas distributor is shaped to have a complete circular shaped portion with discharge holes therein for discharging ammonia gas from the onboard ammonia gas generation unit to the passageway of the inlet and a straight portion shaped to extend from a first attachment point along the inlet to a second attachment point along the mixer duct such that the straight portion of the gas distributor is simply supported relative to the inlet.

Clause 2. The system of any other suitable clause or combination of clauses, wherein the discharge holes in the complete circular shaped portion are evenly spaced circumferentially around the complete circle shaped portion.

Clause 3. The system of any other suitable clause or combination of clauses, wherein the straight portion of the gas distributor is formed to include discharge holes therein for discharging ammonia gas from the onboard ammonia gas generation unit to the passageway of the inlet.

Clause 4. The system of any other suitable clause or combination of clauses, wherein the straight portion of the gas distributor bisects the complete circle shaped portion.

Clause 5. The system of any other suitable clause or combination of clauses, further comprising a perforated plate arranged in the inlet located fluidly between the gas distributor and the selective catalytic reduction unit.

Clause 6. The system of any other suitable clause or combination of clauses, wherein the inlet an inlet cone centered around a primary axis of the exhaust aftertreatment system and a conduit centered around an inlet axis that is offset from the primary axis.

Clause 7. The system of any other suitable clause or combination of clauses, wherein the outlet includes an outlet cone arranged along the primary axis and an outlet conduit, and wherein the outlet conduit is arranged generally perpendicular to the primary axis.

Clause 8. An automotive vehicle, the vehicle comprising
a plurality of wheels,
a combustion engine mechanically coupled to at least some of the plurality of wheels to drive rotation thereof,
an engine compartment housing the combustion engine, and
an exhaust aftertreatment system contained within the engine compartment, the exhaust aftertreatment system including a selective catalytic reduction unit including a catalyst mounted in a housing and an ammonia gas distribution assembly, wherein the ammonia gas distribution assembly includes (i) an inlet that defines a passageway configured to carry exhaust gas from the combustion engine to the selective catalytic reduction unit and (ii) a gas distributor fluidly coupled to the onboard ammonia gas generation unit and arranged to extend into the passageway of the inlet to discharge ammonia gas in a stream of exhaust gas moving into the ammonia gas distribution assembly.

Clause 9. The vehicle of any other suitable clause or combination of clauses, wherein the gas distributor is shaped to have a complete circular shaped portion with discharge holes therein for discharging ammonia gas from the onboard ammonia gas generation unit to the passageway of the mixer duct and a straight portion shaped to extend from a first attachment point along the mixer duct to a second attachment point along the mixer duct such that the straight portion of the gas distributor is simply supported relative to the mixer duct.

Clause 10. The vehicle of any other suitable clause or combination of clauses, wherein the straight portion of the gas distributor bisects the complete circle shaped portion.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. An exhaust aftertreatment system adapted for use in automotive applications, the system comprising
    a selective catalytic reduction unit including a catalyst mounted in a housing,
    an onboard ammonia gas generation unit, and
    an ammonia gas distribution assembly, the ammonia gas distribution assembly including (i) an inlet that defines a passageway configured to carry exhaust gas from an automotive engine toward the selective catalytic reduction unit and (ii) a gas distributor fluidly coupled to the onboard ammonia gas generation unit and arranged to extend into the passageway of the inlet,
    wherein the gas distributor is shaped to have a complete circular shaped portion with discharge holes therein for discharging ammonia gas from the onboard ammonia gas generation unit to the passageway of the inlet and a straight portion shaped to extend from a first attachment point along the inlet to a second attachment point along the inlet such that the straight portion of the gas distributor is simply supported relative to the inlet.

2. The system of claim 1, wherein the discharge holes in the complete circular shaped portion are evenly spaced circumferentially around the complete circle shaped portion.

3. The system of claim 2, wherein the straight portion of the gas distributor is formed to include discharge holes therein for discharging ammonia gas from the onboard ammonia gas generation unit to the passageway of the inlet.

4. The system of claim 3, wherein the straight portion of the gas distributor bisects the complete circle shaped portion.

5. The system of claim 1, further comprising a perforated plate arranged in the inlet located fluidly between the gas distributor and the selective catalytic reduction unit.

6. The system of claim 1, wherein the inlet an inlet cone centered around a primary axis of the exhaust aftertreatment system and a conduit centered around an inlet axis that is offset from the primary axis.

7. The system of claim 6, wherein the outlet includes an outlet cone arranged along the primary axis and an outlet conduit, and wherein the outlet conduit is arranged generally perpendicular to the primary axis.

8. An automotive vehicle, the vehicle comprising
   a plurality of wheels,
   a combustion engine mechanically coupled to at least some of the plurality of wheels to drive rotation thereof,
   an engine compartment housing the combustion engine, and
   an exhaust aftertreatment system contained within the engine compartment, the exhaust aftertreatment system including a selective catalytic reduction unit including a catalyst mounted in a housing and an ammonia gas distribution assembly, wherein the ammonia gas distribution assembly includes (i) an inlet that defines a passageway configured to carry exhaust gas from the combustion engine to the selective catalytic reduction unit and (ii) a gas distributor fluidly coupled to the onboard ammonia gas generation unit and arranged to extend into the passageway of the inlet to discharge ammonia gas in a stream of exhaust gas moving into the ammonia gas distribution assembly.

9. The vehicle of claim 8, wherein the gas distributor is shaped to have a complete circular shaped portion with discharge holes therein for discharging ammonia gas from the onboard ammonia gas generation unit to the passageway of the inlet and a straight portion shaped to extend from a first attachment point along the inlet to a second attachment point along the inlet such that the straight portion of the gas distributor is simply supported relative to the inlet.

10. The vehicle of claim 9, wherein the straight portion of the gas distributor bisects the complete circle shaped portion.

11. The vehicle of claim 9, wherein the inlet is formed to include (i) an aperture that receives an inlet member of the straight portion of the gas distributor and (ii) a notch located opposite the aperture that receives a tail member of the straight portion of the gas distributor.

12. The vehicle of claim 11, wherein one of the inlet member of the straight portion of the gas distributor and the tail member of the straight portion of the gas distributor is fixed to the inlet, and wherein one of the inlet member of the straight portion of the gas distributor and the tail member of the straight portion of the gas distributor is movable in a lengthwise direction relative to the inlet.

13. The system of claim 1, wherein the inlet is formed to include (i) an aperture that receives an inlet member of the straight portion of the gas distributor and (ii) a notch located opposite the aperture that receives a tail member of the straight portion of the gas distributor.

14. The system of claim 13, wherein one of the inlet member of the straight portion of the gas distributor and the tail member of the straight portion of the gas distributor is fixed to the inlet, and wherein one of the inlet member of the straight portion of the gas distributor and the tail member of the straight portion of the gas distributor is movable in a lengthwise direction relative to the inlet.

* * * * *